UNITED STATES PATENT OFFICE.

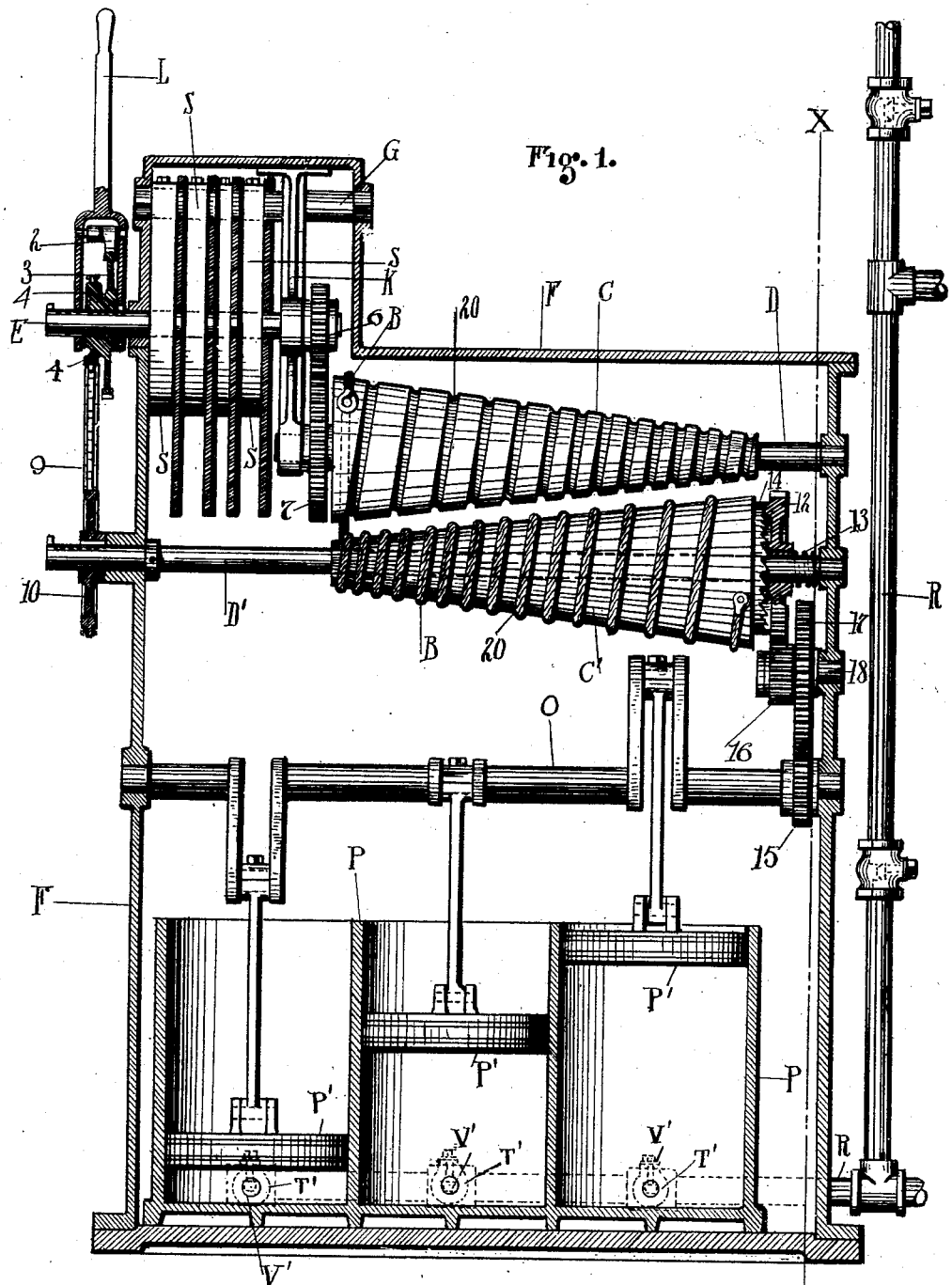

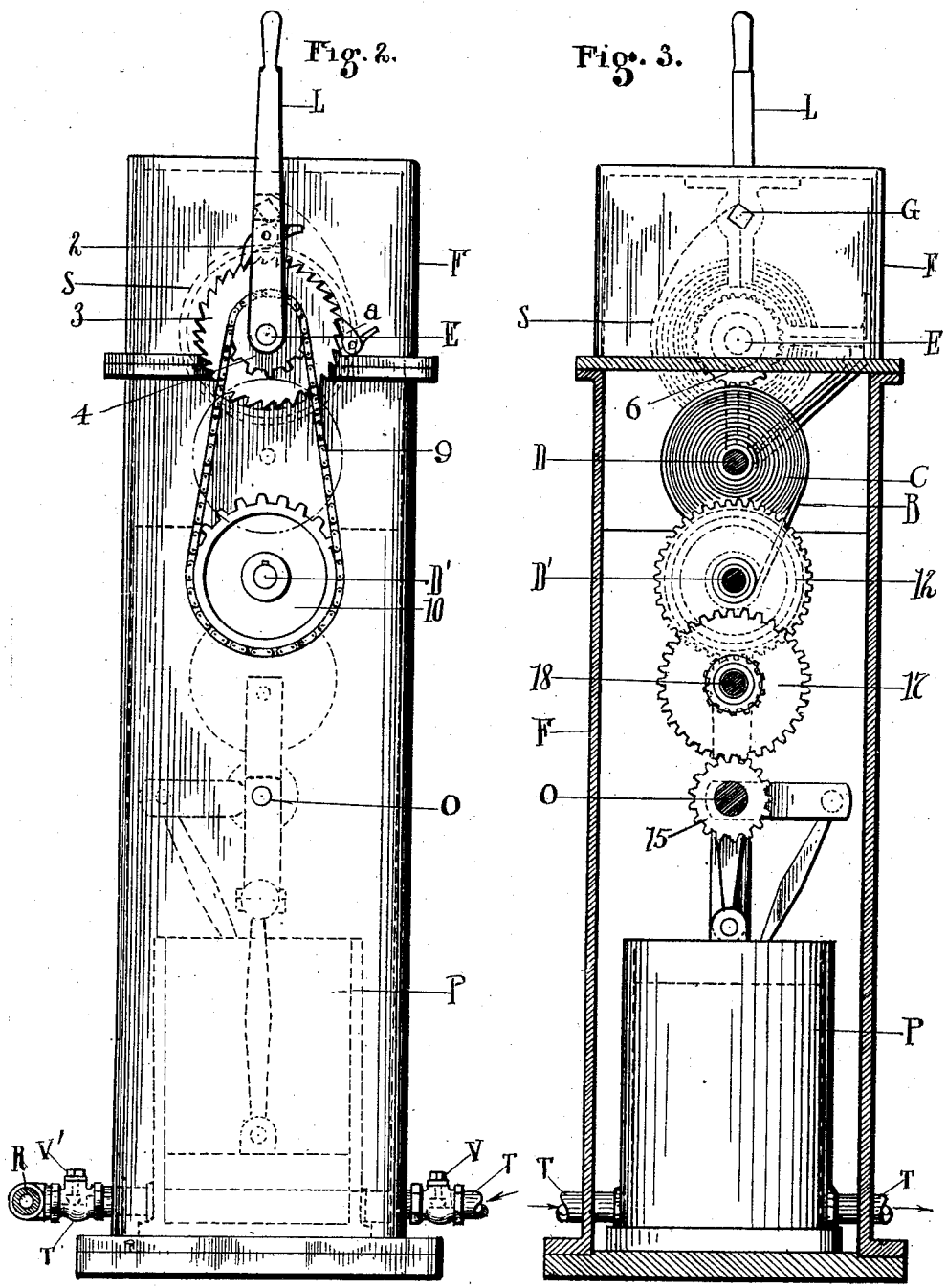

CHARLES A. JOHNSON, OF NORTH RIDGEVILLE, OHIO.

SPRING-POWER MOTOR.

No. 924,669.  Specification of Letters Patent.  Patented June 15, 1909.

Application filed November 27, 1908. Serial No. 464,744.

*To all whom it may concern:*

Be it known that I, CHARLES A. JOHNSON, citizen of the United States, residing at North Ridgeville, in the county of Lorain and State of Ohio, have invented certain new and useful Improvements in Spring-Power Motors, of which the following is a specification.

My invention relates to spring power motors, and the invention consists in the construction and combination of parts, substantially as shown and described and particularly pointed out in the claims.

In the accompanying drawings, Figure 1 is a sectional elevation of the entire machine or motor complete and of a pump with which it has power connection. Fig. 2 is an elevation looking upon the left, Fig. 1, and Fig. 3 is a vertical sectional elevation on line $x-x$, Fig. 1.

The invention as thus shown is adapted for a residence or other building where water is distributed under a sustained pressure.

To this end the invention comprises one or more pumps P, one or more convolute or equivalent power springs S, and intermediate transmitting mechanism adapted to convey and equalize the power to the pumps from the springs, as hereinafter fully described. The said intermediate mechanism comprises two truncated cones C and C′, arranged in reverse relation to each other as to their large and small ends respectively and on parallel shafts D and D′ one above the other in this instance, though they might be side by side horizontally. As shown C represents the drive cone and C′ the driven cone.

Four several coöperating power springs S are employed, said springs being mounted upon or about a shaft E common to all and which are confined within the top of the casing F. A bar G or its equivalent is fixed in the top of said casing and supports the outer ends of said springs. A winding mechanism for said springs and for the belt or cord B which runs from one cone upon the other comprises a hand lever L and ratchet mechanism seen especially at the right of Fig. 1, and said lever is loosely mounted to turn on the outer end of shaft E and carries a pawl 2 adapted to engage a ratchet wheel 3 also free on said shaft. A pawl $a$ holds ratchet wheel 3 against return movement during setting operations, but only temporarily or until the pumps and pipes and headers are completely filled and a back pressure is on.

In operations, both pawls are thrown out when pumping operations are started, and ratchet wheel 3 is only used to rotate sprocket pinion 4 fixed to or integral with ratchet wheel 3 and which is operatively connected with fixed sprocket gear 10 on shaft D′ by chain 9, whereby said driven cone C′ is reversely rotated and caused to wind said belt or cord B back upon itself from cone C to the starting point, Fig. 1, and thereby winding springs S by rotation of shaft E by gears 6 and 7 on shafts E and D, respectively. In other words, power connections between spring shaft E and shaft D of the drive cone is by pinion 6 on shaft E meshing with gear 7 on shaft D and by belt or cable B connecting the cones. In one instance, springs S are the source of power, and in the other, ratchet wheel 3 is used to reverse the order of rotation.

Power is carried forward from driven cone C′ and shaft D′ to the pumps through crank shaft O by a ratchet gear 12 slidably mounted on the end of shaft D′ at the large end of cone C′ and which gear is under sustained pressure by spring 13 thereon to keep it in working position. Said gear has ratchet teeth at its side which are engaged by ratchet teeth 14 on the head of said driven cone C′, the idea being to allow cone C′ to be rotated reversely and slide over or upon said ratchet gear 12 during rewinding or resetting operations, but to make positive or driving engagement therewith in its forward movement to communicate power to the pumps. To this latter end, that is to drive the pump an intermediate gear connection is provided between wheel 12 to pinion 15 on pump shaft O comprising pinion 16 and gear wheel 17 cast in one piece, preferably, and mounted together on a short shaft 18, the wheel 12 meshing with said pinion 16 in all its positions and the said gear 17 meshing with pinion 15.

From the several pumps P, which have pistons P′ operatively connected with crank shaft O, water is conveyed by pipe R to the service pipes, as must be obvious, but the power of the motors may have any other application than to pumps, as may be found useful. Hence said power is not limited to pumping purposes, but when used for supplying liquids there are certain essential features of construction combined therewith to make the whole automatically operative dependent upon withdrawal of liquid at the taps or faucets, and as hereinafter described.

Specifically the spring power shaft E is supported at one end directly in the main casing of the machine and at the other in a bracket K hung from bar G above and having pinion 6 mounted outside thereof on shaft E, while gear 7 comes between said bracket and the end of cone C. This brings the support for corresponding ends of shafts E and D wholly within the wall of the casing and upon the same hanger K.

The two cones C and C' have spiral or worm grooves 20 running from end to end thereof in the same direction or with the same relative inclination and at the same pitch, and the larger end of the drive cone and the smaller end of the driven cone correspond and are next to the springs or source of power. The cord or belt B connecting said cones is secured at its ends to the larger ends of both cones, and to start with said cord or belt is wound in the grooves in the driven cone and unwound upon the drive cone. Then as power is given off to operate the pumps the power reaches the drive cone through gears 16 and 17 and the driven cone through said belt, which starts at the large end of cone C and the small end of cone C'. But as rotation or operation progresses under the action of the springs the belt is gradually wound off cone C' onto cone C. This proceeds at the expense of speed of rotation on cone C' and with corresponding increase on cone C but with equalization of power as well as of operation from one cone upon the other. It will be observed that the spaces between convolutions of the grooves 20 decrease in exactly the same ratio from the large to the small end of both cones and that the said spaces are inverse to each other on the cones. This gives the belt the same relative angle of travel as the inclination or spirality of the grooves and imparts uniform action to the cones.

Presumably the springs will bear rewinding when the end of travel on the cones is reached, and the machine is then wound up again by hand lever L and its ratchet mechanism operating through sprocket chain 9 on cone C' which restores the parts to starting position, Fig. 1. In this operation the cone C slides over or upon the teeth on ratchet wheel 12 and the pump and shaft O stand still.

Each pump has its own inlet valve $v$ and outlet valve $v'$, and corresponding inlet and exhaust pipes T and T' respectively, the exhaust pipes or connections discharging alike into pipe R and the inlet pipes presumably having a common supply pipe connection, not shown.

Respecting the cones C and C', it is to be especially observed as an original and valuable feature that both cones have grooves the same pitch from end to end, the pitch in the small end of a cone being exactly the same as the pitch in the large end of the other cone with the further distinguishing feature that the space or land between convolutions or turns of the grooves decreases with the decreasing size of the cones in cross section and with the same ratio in both. This construction of the cones is necessary to make them practicable with power springs. Hence also the belt or cable B will travel relatively as far axially on the cone C as on cone C' at the start though it revolves only once to the cone C three times, and the same occurs at the opposite ends of said cones and in the same relative proportion throughout their length.

Stand or feed pipes R are preferably provided with check valves to prevent a return flow of liquids from above and as many of these may be used as desired, but it will be understood that the device as a whole maintains a constant supply of liquid within the pipes and pumps under pressure and that no return to the original source of supply is possible because of check valves $v$ in intake pipes T. Therefore, when springs S are wound for action and the pipes are filled, opening of any tap or faucet in the line will immediately relieve the pressure and water will be delivered, and at the same time pistons P' will automatically operate to maintain the supply. Thus as long as liquid is being withdrawn the power springs will operate the pumps, but when the faucet is closed operation of the motor will be automatically checked by the back pressure of the liquid within the line and within the pumps.

What I claim is:—

1. In spring motors, a spring and power transmitting mechanism comprising two cones arranged reversely to each other and operatively connected by a belt, and having spiral grooves with spaces between grooves diminishing proportionally from turn to turn from the larger to the smaller end of the cone.

2. In spring motors, a power transmitting mechanism comprising two reversely arranged cones having worm grooves inclined in the same direction as to the axis thereof and adapted to wind a belt from one member onto the other uniformly at the same inclination as said grooves, and the spaces between the grooves at the larger end of each cone approximately twice as wide as the spaces at the smaller ends of said cones.

3. In power transmission for spring motors, a pair of cones arranged with the small end of one cone opposite the large end of the other, and said cones provided with inclined grooves about their surfaces differentially spaced apart in ratio to the taper of the cones and corresponding with one another in both cones, the wider spaces being at the larger ends of the cones, a suitable belt operatively engaging said cones and hand controlled mechanism for winding said belt from one cone upon the other to starting position.

4. A spring motor, in combination with two power transmitting cones arranged reversely to each other as to their larger and smaller ends and having spiral grooves spaced apart with decreasing width from their larger to their smaller ends, a belt in said grooves operatively uniting said cones, and power connection between said motor and the larger end of one of said cones.

In presence whereof I affix my signature in presence of two witnesses.

CHARLES A. JOHNSON.

Witnesses:
  E. M. FISHER,
  F. C. MUSSUN.